UNITED STATES PATENT OFFICE.

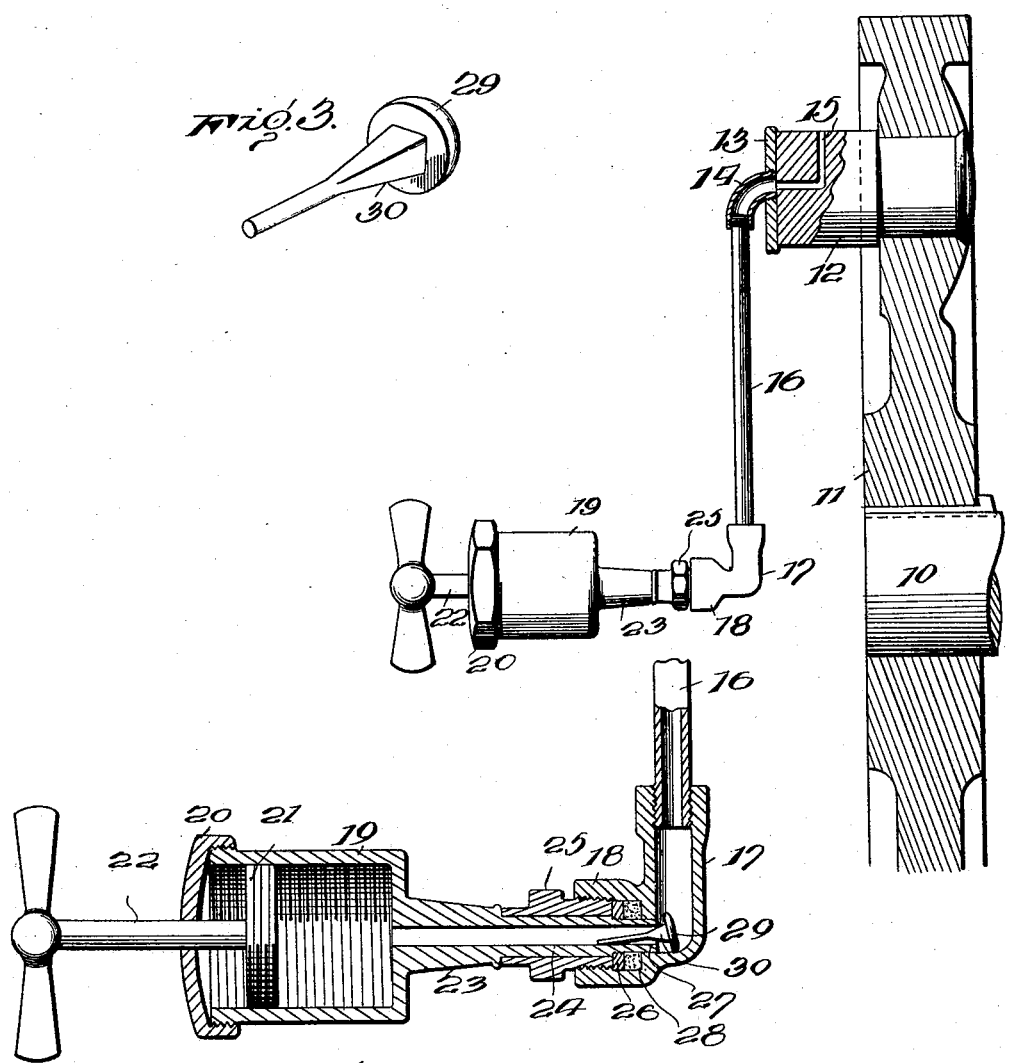

JESSE C. HAYES, OF ROCHELLE, ILLINOIS.

LUBRICATOR.

1,222,949.  Specification of Letters Patent.  Patented Apr. 17, 1917.

Application filed May 6, 1916. Serial No. 95,942.

*To all whom it may concern:*

Be it known that I, JESSE C. HAYES, a citizen of the United States, residing at Rochelle, in the county of Ogle and State of Illinois, have invented certain new and useful Improvements in Lubricators, of which the following is a specification.

This invention contemplates an improved lubricator adapted for lubricating crank pins and has as its primary object to provide a device of this character wherein the lubricator may be manually operated while the crank pin is in motion.

The invention has as a further object to provide an improved mounting for rotatably supporting the cup of the lubricator, and A still further object of the invention is to provide a device of this character employing an automatic shut off valve between the crank pin and the lubricator cup and adapted to prevent a back-flow of lubricant into the cup when the cap thereof is removed.

Other and incidental objects will appear as the description proceeds and in the drawings wherein I have illustrated the preferred embodiment of the invention and wherein similar reference characters designate corresponding parts throughout the several views, Figure 1 is a side elevation partly in section, and showing my improved lubricator in connection with a conventional type of crank pin, Fig. 2 is a fragmentary sectional view more particularly showing the construction and mounting of the several elements of the device, and Fig. 3 is a detail view of the valve for shutting off the back-flow of lubricant from the crank pin into the lubricator cup when the cap of the said cup is removed.

In order that the construction, mounting and operation of my improved device may be made entirely clear, I have, in the drawings, illustrated the lubricator in connection with a conventional type of shaft 10 having a crank 11 suitably connected thereto and upon the outer extremity of which is mounted a laterally directed crank pin 12.

Coming now more particularly to the subject of the present invention, I provide a plate 13 which is secured in any approved manner to the outer end of the pin 12 and is provided axially of the said pin with a screw threaded opening receiving an elbow 14 and communicating with which is a duct or passage 15 formed in the pin and opening upon the periphery thereof. Screw threaded at one extremity into the elbow 14 is a pipe or conduit 16 extending toward the shaft 10 and upon the opposite end of which is screw threaded an elbow 17. The elbow 17 is arranged to extend away from the shaft 10 and is provided with an enlarged outwardly directed terminal 18.

Mounted upon the elbow 17, is a lubricator cup 19 which is closed at its outer extremity by a removable cap 20. Adjustably fitted within the cup, is a follower 21 having screw threaded engagement with the said cup and provided with a stem 22 extending freely through the cap 20. Extending from the bottom of the cup 19 is a hollow stem 23 which is formed with a reduced cylindrical shank 24 having a sleeve 25 freely fitted thereon and connected to the said shank by a nut 26 screw threaded upon the contracted inner terminal 27 of the said stem. The sleeve 25, at its outer extremity, is screw threaded into the enlarged terminal 18 of the elbow 17 with the contracted terminal 27 projecting into the portion of the elbow receiving the pipe 16. Interposed between the bottom wall of the enlarged terminal 18 and the nut 26 is a suitable packing 28 which surrounds the terminal 27 and is adapted to prevent leakage past the sleeve 25. Mounted in the inner extremity of the stem 23, is a valve 29 having a squared shank 30 tapering longitudinally toward its free end and slidably received within the contracted terminal 27 of the said stem with the head of the valve adapted to seat against the inner end of the stem for shutting off communication between the crank pin 12 and the cup 19.

It will now be noted that the cup 19 is rotatably supported by the sleeve 25 and that the said cup is mounted with its axis arranged in alinement with the axis of the shaft 10. Consequently, the said cup will, as the pin revolves, rotate about the axis of the said shaft and the cup may, therefore, be grasped and held stationary by one hand of the operator while the other hand is employed to shift the plunger 21 for forcing lubricant out of the cup 19 through the pipe 16 and the duct 15 to emerge upon the periphery of the crank pin, this operation being thus possible while the said crank pin is in motion. In this connection, particular attention is directed to the function of the valve 29. When it is desired to refill the cup 19, the cap 20 thereof and the plunger 21 are, of course, removed. When so removed, the column of lubricant within the pipe 16 will tend to flow downwardly into the cup. However, such back-flow of lubricant will immediately act upon the valve 29 to automatically close the said valve and consequently prevent the escape of the said lubricant within the pipe 16 into the stem of the cup 19 to run out at the open end of the cup. Accordingly, by providing the said valve, a very convenient arrangement is had whereby the cup may be easily filled without likelihood of wasting any of the lubricant.

It will therefore be seen that I provide a very simple and efficient construction for the purpose set forth and a lubricator which may, without difficulty, be easily attached to substantially any conventional type of crank pin.

Having thus described my invention, what I claim and desire to secure by Letters Patent is:

1. The combination with a shaft having a crank pin associated therewith, of a lubricator carried by the pin and having communication with the periphery thereof, the said lubricator including a cup supported axially of the said shaft and provided with a stem, and a valve having a head, and a stem loosely received within the stem of said cup for guiding the valve head to active position closing the stem of the cup with the valve automatically operable by a back pressure from the pin toward the cup to abut off a back flow of lubricant from the said pin into the cup.

2. In a lubricator of the character described, a cup having a stem, a sleeve freely receiving the stem, means connecting the sleeve with the said stem, and a connection receiving the sleeve for rotatably supporting the cup upon the said connection.

3. In a lubricator of the character described, a cup having a stem, a sleeve freely receiving the stem, a feed pipe operatively receiving the sleeve for rotatably supporting the cup upon the said pipe, and a valve slidable within the stem for automatically shutting off a back flow of lubricant from the pipe into the cup.

4. In a lubricator of the character described, a feed pipe, a cup provided with a stem having a cylindrical shank, a sleeve carried by the said shank and having operative screw threaded connection with the said pipe to rotatably support the cup upon the pipe, a nut screw threaded upon the inner extremity of the stem for connecting the sleeve with the shank, and a valve slidable within the inner extremity of the stem for shutting off a back-flow of lubricant from the feed pipe into the cup.

5. In a lubricator of the character described, a cup having a stem, a sleeve carried by the stem, means rotatably connecting the sleeve with the stem, and a feed pipe operatively receiving the sleeve for rotatably supporting the cup upon the said pipe.

In testimony whereof I affix my signature.

JESSE C. HAYES. [L. S.]

Copies of this patent may be obtained for five cents each, by addressing the "Commissioner of Patents, Washington, D. C."